(12) United States Patent
Hochsmann et al.

(10) Patent No.: US 7,807,077 B2
(45) Date of Patent: Oct. 5, 2010

(54) METHODS AND SYSTEMS FOR THE MANUFACTURE OF LAYERED THREE-DIMENSIONAL FORMS

(75) Inventors: Rainer Hochsmann, Genderkingen (DE); Ingo Ederer, Riederau (DE)

(73) Assignee: Voxeljet Technology GmbH, Augsburg (DE)

( * ) Notice: Subject to any disclaimer, the term of this patent is extended or adjusted under 35 U.S.C. 154(b) by 0 days.

(21) Appl. No.: 10/866,205

(22) Filed: Jun. 11, 2004

(65) Prior Publication Data

US 2005/0017394 A1 Jan. 27, 2005

Related U.S. Application Data

(60) Provisional application No. 60/478,778, filed on Jun. 16, 2003.

(51) Int. Cl.
*B22C 9/00* (2006.01)
*B29C 33/38* (2006.01)
*B29C 41/02* (2006.01)

(52) U.S. Cl. .................. 264/113; 164/15; 164/526; 264/219

(58) Field of Classification Search ............. 264/112, 264/113, 308, 401
See application file for complete search history.

(56) References Cited

U.S. PATENT DOCUMENTS

| | | | |
|---|---|---|---|
| 2,640,629 A | 6/1953 | Thomson et al. |
| 2,692,142 A | 10/1954 | Hunter |
| 2,857,938 A | 10/1958 | Wahl |
| 3,616,969 A | 11/1971 | Koizumi |
| 3,616,972 A | 11/1971 | Christy |
| 3,815,527 A | 6/1974 | Dobbins |
| 3,913,503 A | 10/1975 | Becker |
| 4,239,715 A | 12/1980 | Pratt |
| 4,247,508 A | 1/1981 | Householder |
| 4,279,949 A | 7/1981 | Esser et al. |
| 4,369,025 A | 1/1983 | Von Der Weid |
| 4,575,330 A | 3/1986 | Hull |
| 4,579,252 A | 4/1986 | Wilson |
| 4,630,755 A | 12/1986 | Campbell |
| 4,669,634 A | 6/1987 | Leroux |
| 4,752,352 A | 6/1988 | Feygin |
| 4,863,538 A | 9/1989 | Deckard |
| 4,889,433 A | 12/1989 | Pratt |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,076,869 A | 12/1991 | Bourell et al. |
| 5,127,037 A | 6/1992 | Bynum |
| 5,132,143 A | 7/1992 | Deckard |
| 5,147,587 A | 9/1992 | Marcus et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,221,539 A | 6/1993 | Pallerberg et al. |
| 5,248,456 A | 9/1993 | Evans et al. |
| 5,252,264 A | 10/1993 | Forderhase et al. |
| 5,284,695 A | 2/1994 | Barlow et al. |
| 5,296,062 A | 3/1994 | Bourell et al. |
| 5,316,580 A | 5/1994 | Deckard |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,431,967 A | 7/1995 | Manthiram et al. |
| 5,433,520 A | 7/1995 | Adams |
| 5,482,659 A | 1/1996 | Sauerhoefer |
| 5,490,962 A | 2/1996 | Cima et al. |
| 5,518,680 A | 5/1996 | Cima et al. |
| 5,573,055 A | 11/1996 | Melling et al. |
| 5,597,589 A | 1/1997 | Deckard |
| 5,601,868 A | 2/1997 | Gerhardt |
| 5,616,294 A | 4/1997 | Deckard |

(Continued)

FOREIGN PATENT DOCUMENTS

DE 4300478 C1 8/1994

(Continued)

OTHER PUBLICATIONS

International Search Report dated Jan. 11, 2005.

(Continued)

*Primary Examiner*—Leo B Tentoni
(74) *Attorney, Agent, or Firm*—Dobrusin & Thennisch PC

(57) ABSTRACT

New methods and systems for manufacturing a three-dimensional form, comprising steps of providing a plurality of particulates; contacting the particulates with an activation agent; contacting particulates having the activation agent with a binder material that is activatable by the activation agent; at least partially hardening the binder for forming a layer of the three-dimensional form; and repeating these steps to form the remainder of the three-dimensional form. Following sequential application of all required layers and binder material to make the form, the unbound particles are appropriately removed (and optionally re-used), to result in the desired three-dimensional form. The invention also contemplates a novel method for preparing a form, where unbound particulates free of binder material are re-claimed.

32 Claims, No Drawings

U.S. PATENT DOCUMENTS

| | | | |
|---|---|---|---|
| 5,639,070 A | 6/1997 | Deckard | |
| 5,639,402 A | 6/1997 | Barlow et al. | |
| 5,647,931 A | 7/1997 | Retallick et al. | |
| 5,658,412 A | 8/1997 | Retallick et al. | |
| 5,730,925 A | 3/1998 | Wilkening et al. | |
| 5,753,274 A | 5/1998 | Wilkening et al. | |
| 5,807,437 A | 9/1998 | Sachs et al. | |
| 5,851,465 A * | 12/1998 | Bredt | 264/109 |
| 5,902,441 A | 5/1999 | Bredt et al. | |
| 5,902,537 A | 5/1999 | Almquist et al. | |
| 5,934,343 A | 8/1999 | Gaylo et al. | |
| 5,943,235 A | 8/1999 | Earl et al. | |
| 5,965,170 A | 10/1999 | Matsuoka et al. | |
| 6,007,318 A | 12/1999 | Russell et al. | |
| 6,036,777 A | 3/2000 | Sachs | |
| 6,042,774 A | 3/2000 | Wilkening et al. | |
| 6,048,188 A | 4/2000 | Hull et al. | |
| 6,094,994 A | 8/2000 | Satake et al. | |
| 6,116,517 A | 9/2000 | Heinz et al. | |
| 6,146,567 A | 11/2000 | Sachs et al. | |
| 6,147,138 A | 11/2000 | Hochsmann et al. | |
| 6,155,331 A * | 12/2000 | Langer et al. | 164/456 |
| 6,193,922 B1 | 2/2001 | Ederer | |
| 6,217,816 B1 | 4/2001 | Tang | |
| 6,258,170 B1 | 7/2001 | Somekh et al. | |
| 6,316,060 B1 | 11/2001 | Elvidge et al. | |
| 6,322,728 B1 * | 11/2001 | Brodkin et al. | 264/19 |
| 6,355,196 B1 | 3/2002 | Kotnis et al. | |
| 6,375,874 B1 | 4/2002 | Russell et al. | |
| 6,401,001 B1 | 6/2002 | Jang et al. | |
| 6,403,002 B1 * | 6/2002 | van der Geest | 264/113 |
| 6,416,850 B1 | 7/2002 | Bredt et al. | |
| 6,423,255 B1 | 7/2002 | Hoechsmann et al. | |
| 6,436,334 B1 | 8/2002 | Hattori et al. | |
| 6,460,979 B1 | 10/2002 | Heinzl et al. | |
| 6,467,525 B2 | 10/2002 | Herreid et al. | |
| 6,500,378 B1 | 12/2002 | Smith | |
| 6,554,600 B1 | 4/2003 | Hofmann et al. | |
| 6,610,429 B2 | 8/2003 | Bredt et al. | |
| 6,733,528 B2 * | 5/2004 | Abe et al. | 623/11.11 |
| 6,830,643 B1 | 12/2004 | Hayes | |
| 6,838,035 B1 | 1/2005 | Ederer et al. | |
| 7,004,222 B2 | 2/2006 | Ederer et al. | |
| 7,204,684 B2 | 4/2007 | Ederer et al. | |
| 7,381,360 B2 | 6/2008 | Oriakhi et al. | |
| 2001/0050031 A1 | 12/2001 | Bredt et al. | |
| 2002/0016387 A1* | 2/2002 | Shen | 523/201 |
| 2002/0026982 A1 | 3/2002 | Bredt et al. | |
| 2004/0012112 A1* | 1/2004 | Davidson et al. | 264/113 X |
| 2004/0025905 A1 | 2/2004 | Ederer et al. | |
| 2004/0026418 A1 | 2/2004 | Ederer et al. | |
| 2004/0035542 A1 | 2/2004 | Ederer et al. | |
| 2004/0056378 A1* | 3/2004 | Bredt et al. | 264/109 |
| 2004/0094058 A1* | 5/2004 | Kasperchik et al. | 101/483 |
| 2004/0145088 A1 | 7/2004 | Patel et al. | |
| 2004/0170765 A1 | 9/2004 | Ederer et al. | |
| 2005/0017394 A1 | 1/2005 | Hochsmann et al. | |
| 2005/0167872 A1 | 8/2005 | Tsubaki et al. | |
| 2006/0105102 A1 | 5/2006 | Hochsmann et al. | |
| 2006/0175346 A1 | 8/2006 | Ederer et al. | |

FOREIGN PATENT DOCUMENTS

| | | |
|---|---|---|
| DE | 4325573 | 2/1995 |
| DE | 29506204.5 | 4/1995 |
| DE | 4400523 C2 | 7/1995 |
| DE | 4440397 | 9/1995 |
| DE | 29701279 | 1/1997 |
| DE | 19511772 C2 | 9/1997 |
| DE | 19723892 | 9/1998 |
| DE | 19846478 | 4/2000 |
| DE | 19846478 A1 | 4/2000 |
| DE | 19853834 | 5/2000 |
| DE | 19853834 A1 | 5/2000 |
| DE | 10047614 | 4/2002 |
| DE | 10117875 | 1/2003 |
| DE | 10216013 A1 | 10/2003 |
| EP | 0711213 B1 | 5/1995 |
| EP | 0361847 | 11/1995 |
| EP | 0431924 | 1/1996 |
| EP | 0739666 | 10/1996 |
| EP | 0688262 | 6/1999 |
| EP | 0734842 | 8/1999 |
| EP | 1163999 A2 | 5/2001 |
| EP | 0 968 776 | 10/2002 |
| FR | 2790418 | 9/2000 |
| WO | WO 95/18715 | 7/1995 |
| WO | WO 96/05038 | 2/1996 |
| WO | WO 00/03324 | 1/2000 |
| WO | WO 00/21736 | 4/2000 |
| WO | WO 01/26885 | 4/2001 |
| WO | WO 01/72502 A1 | 4/2001 |
| WO | WO 01/34371 | 5/2001 |
| WO | WO 02/26419 | 4/2002 |
| WO | WO 02/26420 | 4/2002 |
| WO | WO 02/26478 | 4/2002 |
| WO | WO 02/28568 | 4/2002 |
| WO | WO 02/064353 | 8/2002 |
| WO | WO 02/064354 | 8/2002 |
| WO | WO 02/083323 | 10/2002 |
| WO | WO 03/016030 | 2/2003 |
| WO | WO 03/086726 | 10/2003 |
| WO | WO 03/097518 | 11/2003 |
| WO | WO 03/103932 A1 | 12/2003 |
| WO | WO 2004/112988 | 12/2004 |
| WO | WO 2005/080010 | 9/2005 |
| WO | WO 2005/113219 A1 | 12/2005 |

OTHER PUBLICATIONS

Copending U.S. Appl. No. 10/381,546 (corresponds with PCT WO 02/26419), Aug. 7, 2003.
Copending U.S. Appl. No. 11/320,050 (corresponds with PCT WO 02/26420), Dec. 28, 2005.
Copending U.S. Appl. No. 10/510,543 (Corresponds with PCT WO 03/086726), Oct. 17, 2005.
Copending U.S. Appl. No. 10/514,667 (Corresponds with PCT WO 03/097518), Jun. 24, 2005.
Copending U.S. Appl. No. 10/559,920 (Corresponds with PCT WO 04/112988), Dec. 8, 2005.
Cima et al., "Computer-derived Microstructures by 3D Printing: Bio- and Structural Materials," SFF Symposium, Austin, TX, 1994.
Copending National Phase Application, WO 02/26420, Apr. 4, 2002.
Copending National Phase Application, WO 02/26478, Apr. 4, 2002.
Copending National Phase Application, WO 02/28568, Apr. 11, 2002.
Copending National Phase Application, WO 02/083323, Oct. 24, 2002.
Copending National Phase Application, WO 03/103932, Dec. 18, 2003.
EOS Operating Manual for Laser Sintering Machine with Brief Summary.
Gephart, Rapid Prototyping, pp. 118-119, 1996.
International Search Report, PCT/DE00/03324, Jun. 5, 2001.
International Search Report, PCT/DE01/03661, Feb. 28, 2002.
International Search Report, PCT/DE01/03662, Mar. 1, 2002.
International Search Report, PCT/DE02/01103, Sep. 30, 2002.
Marcus et al., Solid Freedom Fabrication Proceedings, Nov. 1993.
Opposition of Patent No. DE10047614, Jun. 25, 2003.
Opposition to European Patent No. 1322458 B1 (with translation), Jan. 19, 2005.
Sachs et al., "Three-Dimensional Printing: Rapid Tooling and Prototypes Directly from a CAD Model", Massachusetts Institute of Technology, pp. 143-151.

Sachs et al., "Three-Dimensional Printing: Rapid Tooling and Prototypes Directly from a CAD Model", Massachusetts Institute of Technology, pp. 131-136.

Williams, "Feasibility Study of Investment Casting Pattern Design by Means of Three Dimensional Printing", Department of Machanical Enginerring, pp. 2-15, Jun. 5, 1989.

Copending National Phase Application, WO 05/080010, Sep. 1, 2005.

Copending National Phase Application, WO 05/113219, Dec. 1, 2005.

Jacobs et al., 2005 SME Technical Paper, title Are QuickCast Patterns Suitable for Limited Production, 2005.

Feature Article—Rapid Tooling—Cast Resin and Sprayed Metal Tooling by Joel Segal, Apr. 2000.

Copending U.S. Appl. No. 11/767,778, filed Jun. 25, 2007.

Marcus, et al., Solid Freeform Fabrication Proceedings, Sep. 1995, p. 130-133.

US 4,937,420, 06/1990, Deckard (withdrawn)

\* cited by examiner

METHODS AND SYSTEMS FOR THE MANUFACTURE OF LAYERED THREE-DIMENSIONAL FORMS

The present application claims the benefit of the filing date of U.S. Provisional Application Ser. No. 60/478,778, filed Jun. 16, 2003, the contents of which are hereby expressly incorporated by reference.

TECHNICAL FIELD

The present invention relates to the manufacture of three-dimensional forms and more particularly relates to the manufacture of a three-dimensional form by the successive layer-by-layer build up of a composite including particles in a hardened binder material.

BACKGROUND OF THE INVENTION

The present invention is predicated upon the discovery of improvements to materials and techniques useful for a process that has gained recognition in the art as "three-dimensional printing". A number of efforts in this field have been made to date, including by way of example those disclosed in U.S. Pat. Nos. 6,147,138, 6,193,922, 6,423,255, 6,416,850, 6,375,874, 6,007,318, 5,204,055, 5,340,656, 5,387,380, 5,490,962, 5,518,680, 5,902,441 and PCT Application Nos. WO 02/26420 (PCT/DE01/03661), WO 02/26478 (PCT/DE01/03662), WO 02/28568 (PCT/DE01/03834), WO 02/26419 (PCT/DE00/03324), and WO 02/083323 (PCT/DE02/01103), all of which are hereby expressly incorporated by reference.

By way of illustration, U.S. Pat. No. 5,204,055 addresses a method that includes layer based deposition of untreated particulated material. A binder material is liquid dosed to selectively bind the particles. The binder is hardened and the part is unpacked. The patent is limited in its teachings with regard to sequencing for contacting of particles with agents for binding the particles.

In WO96/05038, there is disclosed a method for production of bone implants including mixing a powder with a binder, layer based deposition, selectively laser sintering or selectively spraying an agent on top of each layer to bind the particles. The document likewise is limited in its teachings with regard to sequencing for contacting of particles with agents for binding the particles.

In U.S. Pat. No. 6,416,850, there is described a method whereby certain purported non-toxic materials characterized as adhesives (e.g., water soluble polymers and carbohydrates) are mixed with particles and other ingredients and selectively aggregated by depositing a solvent in which the adhesive is highly soluble. The patent is limited in its teachings with regard to sequencing for contacting of particles with agents for binding the particles. Additionally, it is believed to not enable a process where agents are cross-linked for assisting in bonding, particularly to make a form sufficiently strong and thermal resistant to serve as a mold.

It is thus an objective of the present invention to provide improved and efficient alternatives for preparing a three-dimensional form with a layer-by-layer build-up technique, particularly through the use of a binding material system that is at least two components.

SUMMARY OF THE INVENTION

Accordingly, the present invention is predicated upon the discovery of a new method for manufacturing a three-dimensional form, comprising the steps of providing a plurality of particulates; contacting at least a portion of a surface of the particulates with an activation agent; contacting a pre-selected portion of the particulates having the activation agent with a binder material that is activatable by the activation agent; hardening the binder for forming a layer of the three-dimensional form; and repeating these steps to form the remainder of the three-dimensional form. Following the sequential application of all of the required layers and binder material to form the part in question, the unbound particles are appropriately removed (and optionally re-used), resulting in the formation of the desired three-dimensional form.

Preferably the binder material is selectively supplied to the particulates (e.g., by using an ink-jet printing technique, or other suitable technique for precise fluid dispensing), in accordance with a computer model of the three-dimensional part being formed, such as from the use of a Computer Aided Design (CAD) file (e.g., CAD file data that results from a finite element analysis). In this manner predefined sub-areas of each layer can be varied relative to adjoining layers. The agent is adapted to effectively create a binder for firmly coupling adjoining particles, whether by Van der Waals forces, cross-linking, other covalent bonding, ionic bonding, metallic bonding, combinations thereof or by another mechanism).

According to a particularly preferred approach of the present invention, each layer of the form being manufactured is initially provided as a layer including a plurality of particulates in the absence of a binder material. Preferably, the binder material is dispensed by a suitable fluid dispenser into the respective sub-areas of a layer whereupon it contacts an activation agent and is activated for hardening to form a matrix that has the particles firmly held within it.

Though it is contemplated that the binder material and the activation agent may be dispensed individually onto a layer of particles, or that particles may be dispensed onto a layer, film or other area of activation agent, it is most preferred that the binder material is dispensed onto a sub-area of a layer of particles that are contacted, prior to dispensing of the binder material with an activation agent.

It is thus found that a number of benefits are possible using the methods of the present invention. By way of example, it is possible to better manage material usage and reduce overall cost by improving control over the total amount of binder that is used (which in many instances is desirably a thermoset or crosslinkable resin that may require special handling or waste disposal). Further, the absence of a binder makes it possible to more efficiently reclaim and re-use particles in subsequent fabrications. That is, the particles will be substantially free of binder material that could preclude further use of the particles.

Thus, an advantageous method for making a three dimensional form could comprise the steps of providing a plurality of particulates; contacting at least a portion of a surface of the particulates with a multiple-component binder material system including a binder material as one of the components; hardening the binder for forming a layer of the three-dimensional form; repeating the steps to form the remainder of the three-dimensional form; and re-claiming unbound particulates, said unbound particulates being free of binder material.

In addition, it is possible to reduce the potential for nozzle clogging. It is also found that good control over the extent unreacted binder material is possible to help minimize a potential source of gas formation, which is potentially problematic in some applications (e.g., where the three-dimensional form is used as a mold for casting a high melting point material and the mold is highly complex, such as with a automotive cylinder head mold or another intricate form).

The present invention affords good control over binder deposition and permits for high degrees of variations within a layer and within cross-sections of the form.

The present invention also affords other benefits. For example, in one particularly preferred aspect of the present invention, functional groups or reactive components of the binder material are susceptible to evaporation, especially at higher temperatures. The ability to better control and even delay when the binder material is going to be contacted with particles helps to assure that a greater effective amount of the functional groups or reactive components will be present over time. Thus, consumption of overall amounts of the binder material can be further reduced, as compared with a process in which the binder material is contacted initially with particles, prior to the activation agent. To illustrate, if furane resin is employed as a binder for a sand, it is more likely that at higher temperatures, the furfurylic alcohol of the resin will evaporate at higher temperatures. That means the sand has to be used very quick (e.g., within minutes) after mixing with the furane resin, or else the sand must be sealed, in order to preserve the efficacy of the binder material. On the other hand, if the sand is contacted with activation agent first, the activation agent (e.g., an acid such as sulfuric acid that is relatively stable at normal operating conditions) will very often not be susceptible to substantial effects of temperature or atmosphere. Thus, enhanced particle stability permits for longer delays between steps, as well as the introduction of additional intermediate processing steps. Delays between steps of 2 hours or more, or as long as 12 hours are also possible, without compromising particle reactivity or stability. In one preferred embodiment, particles contacted with an activation agent as disclosed herein can await 24 hours or more and remain free of degradation to binding function, in the absence of contacting with a binder material.

It is also likely that there will be fewer adverse secondary effects caused by evaporation of functional groups or reactive components. For example, the susceptibility of the evaporated materials to re-deposit elsewhere within the system (e.g., on the print head) is reduced. This leads to longer system component cleaning cycles, which again increases the productivity.

The present invention also contemplates kits for supplying the necessary consumable materials to carry out the preferred methods. For example, one such kit for preparing a three-dimensional form, may include a first container including a binder material, and a second container including a particulated material and an activation agent for the binder material.

DETAILED DESCRIPTION OF THE PREFERRED EMBODIMENT

The present invention is predicated upon the discovery of a new method for manufacturing a three-dimensional form, comprising the steps of providing a plurality of particulates; contacting at least a portion of a surface of the particulates with an activation agent; contacting a pre-selected portion of the particulates having the activation agent with a binder material that is activatable by the activation agent; hardening the binder for forming a layer of the three-dimensional form; and repeating these steps to form the remainder of the three-dimensional form.

In an especially preferred aspect, though not intended as a limitation of the scope and applicability of the invention, the invention contemplates a method for manufacturing a mold comprising the steps of providing a plurality of particulates; contacting at least a portion of a surface of the particulates with an activation agent for causing cross-linking of an organic binder material; depositing the binder material onto a pre-selected portion of the particulates; hardening the binder for forming a layer of the mold; and repeating these steps to form the remainder of the mold.

The particles of the present invention may be any suitable finely divided material that is capable of being bonded to form an aggregate with an activated binder. The particles may be organic, inorganic, or a mixture thereof. They may be ceramic, metal, plastic, carbohydrate, small organic molecule, large organic molecule, combinations thereof or the like.

Preferably the particles are generally mono-disperse. Thus, the particles preferably have at least 80 percent by volume of an average particle size ranging from about 30 µm to about 450 µm, more preferably about 90 µm to about 210µ, and still more preferably on the order of 140 µm. Polydisperse collections of particles are also possible. Larger and smaller particle sizes are also possible and the above ranges are not intended as limiting of the invention.

A highly preferred material for use as the particles of the present invention, particularly for use in the manufacture of molds, is sand, and more particularly foundry sand. Examples of suitable sands include silica. In a more preferred aspect the sand is selected from the group consisting of quartz, zircon, olivin, magnetite, or combinations thereof. Sands may be virgin sand, reclaimed sand, or a combination thereof. The sands may also include ingredients common to foundry sand such as a binder (e.g., clay, wood flour, chemical additives, etc.), carbonaceous additives, or other ingredients.

It will be appreciated from the above, that sand particles are not the only particles useful in the present invention. Other art-disclosed particles may be employed, such as cera beads, metal particles, ceramic particles, polymeric particles, combinations thereof or the like.

The binder of the present invention may be any suitable material that is capable of firmly coupling adjoining particulates to each other. In a highly preferred aspect, the binder material is an organic compound, and more particularly an organic compound that includes molecules that cross-link or otherwise covalently bond among each other.

In a highly preferred embodiment, the preferred material for the binder includes at least one material selected from the group consisting of phenol resin, polyisocyanate, polyurethane, epoxy resin, furane resin, polyurethane polymer, phenolic polyurethane, phenol-formaldehyde furfuryl alcohol, urea-formaldehyde furfuryl alcohol, formaldehyde furfuryl alcohol, peroxide, polyphenol resin, resol ester or mixtures thereof.

Though other viscosities are possible, during dispensing through a print head, preferably, the viscosity of the binder material at 20° C. preferably ranges from 5 to about 60 cps, and more preferably 10 to 50 cps, and still more preferably about 14 to about 20 cps.

It may also be possible to employ one or more inorganic binders such as, without limitation a silicate (e.g., sodium silicate), a salt, plaster, bentonite or mixtures thereof.

Other art-disclosed ingredients may also be employed to form a binder in the present invention, such as those disclosed in U.S. Pat. No. 6,416,850, hereby incorporated by reference, including for example water-soluble polymers, carbohydrates, sugars, sugar alcohols, or proteins. Suitable water-soluble polymers include polyethylene glycol, sodium polyacrylate, polyvinyl alcohol, polyvinyl pyrrolidone, sodium polyacrylate copolymer with maleic acid, and polyvinyl pyrrolidone copolymer with vinyl acetate; carbohydrates include acacia gum, locust bean gum, pregelatinized starch, acid-modified starch, hydrolyzed starch, sodium carboxymethylcellulose, sodium alginate and hydroxypropyl cellulose. Suitable sugars and sugar alcohols include sucrose, dextrose, fructose, lactose, polydextrose, sorbitol and xylitol. Organic compounds including organic acids and proteins can also be used, including citric acid, succinic acid, polyacrylic acid, gelatin, rabbit-skin glue, soy protein, and urea. Thus it is contemplated that the binder may include a binding component that is free of a thermoset resin.

The activation agent of the present invention is preferably an ingredient that in the presence of the binder material (and optionally in the presence of another controllable atmospheric condition, e.g., heat, moisture, or otherwise), will cause the binder material to bond to itself and to adjoining particles. The activation agent is preferably provided as a solid, liquid, gel, or combination thereof. It may include an art-disclosed curing agent, initiator, or both for the above mentioned binder materials.

For example, in one particularly preferred embodiment, (e.g., where a furane resin, epoxy or both is employed), the activation agent is an agent selected from an acid, an amine, an ester or a combination thereof. Preferred acids, for example, are those having a pH of from 1 to 6, and more preferably less than 4. Examples of suitable acids include organic acids, inorganic acids, or combinations thereof, such as one or more acids selected from the group consisting of sulfuric acid, sulfonic acid (e.g., methanesulfonic acid, toluenesulfonic acid or the like), hydrochloric acid, phosphoric acid, hydrochloric acid, and nitric acid. The activation agent may be a relatively low viscosity material or a relatively high viscosity material. Thus, it is also contemplated that a dimer or trimer acid, a fatty acid, or combinations thereof may be employed. Other acids are also contemplated, including without limitation, (poly)carboxylic acids, The activation agent may consist of a single ingredient or a plurality of ingredients. For example, as taught in U.S. Pat. No. 6,423,255, the curing agent may comprise toluene sulfonic acid in a proportion of 45 to 55 percent, diethylene glycol in a proportion of 5 to 15 percent, and sulphuric acid in a proportion of at most 1 percent.

Suitable amines are selected from primary amines, secondary amines, tertiary amines, or combinations thereof. For example, without limitation, the amine may be selected from the group consisting of aliphatic amines, aromatic amines, polyoxyalkyleneamines, phenalkamines, alkyl amines, alkylene amines, combinations thereof, or the like.

To the extent not already mentioned, other art disclosed curing agents may also be employed, such as catalytic curing agents (e.g., boron-containing complexes or compounds), amides, polyamides.

It is also possible that the activation agent may be such that it becomes active upon the liberation of a gas (e.g., a dioxide, such as carbon dioxide, sulfur dioxide) from within it. Thus, such a preferred activation agent preferably is one that is capable of liberating such a gas in the presence of the binder material.

Of course, other activation agents are also possible. For example, as described in U.S. Pat. No. 6,416,850, hereby incorporated by reference, an activating fluid may be employed, such as a solvent selected from water, methyl alcohol, ethyl alcohol, isopropyl alcohol, acetone, methylene chloride, acetic acid, and ethyl acetoacetate.

The skilled artisan will appreciate that in certain embodiments it may also be desirable to include one or more additional components such as to assist in processing of the materials, to improve a property of a material, or otherwise. Thus, it is further contemplated that in addition to the particles, binder and activation agent, there might be employed a filler, a reinforcement, a curing accelerator, a surfactant, a thickener, adhesion promoters, dyes, thermal indicators, humectants, combinations thereof or the like. Examples of fillers include, without limitation, mineral fillers, starches (e.g., maltodextrin), combinations thereof or the like. Reinforcements might include metal, plastic (e.g., aramid, polyester, cellulose, derivatives thereof or the like), ceramic, graphite, carbon or combinations thereof, and may be in the form of whiskers, fibers, combinations thereof or the like.

Other art-disclosed ingredients may include, for example, lecithin, a polyol (e.g., polyethylene glycol or polypropylene glycol), citronellol, an acetate (e.g., ethylene glycol diacetate), a sulfate (e.g., potassium aluminum sulfate), a sulfonate, an alcohol, an ether, a (meth)acrylate, a (meth)acrylic acid, a polyvinyl pyrrolidone, or combinations thereof.

It should be appreciated that any of the liquid ingredients herein may further contain additional ingredients, such as diluents (e.g., water, a ketone, or another organic solvent (e.g., toluene or the like)).

In a particularly preferred aspect of the present invention, a three-dimensional form is prepared using a layer-by-layer build-up approach, pursuant to which binder material is contacted with particles no earlier than when the binder material first contacts the activation agent. Thus, it is possible that both the binder material and the activation agent are supplied simultaneously to the particles (which are optionally pre-contacted with the activation agent). More preferably, the particles are mixed in intimate contact with the activation agent, spread over a surface and then selectively contacted in sub-areas (which can be from a small portion to the entirety of the mass of material) with the binder material.

Under the latter approach, mixing may be done in any suitable manner, and may be done by a batch mixer, a continuous mixer or a combination thereof. Preferably, the particles are mixed for a sufficient time so that a coating is developed over at least a portion of the exposed surface of the particle (which the skilled artisan should appreciate may be fully dense or porous). By way of example, without limitation a batch of about 1 to 25 kg (more preferably about 10 kg) is loaded into a rotating mixer along with an activation agent and rotated for a desired amount of time (e.g., sufficient to develop a layer around the particle to enlarge it to a diameter of about 0.25 to about 2.5 times the uncoated particle diameter, and more preferably about 1.5 times the uncoated particle diameter).

The premixed particles are then suitably transported to a work site, such as by a suitable conveyor (e.g., a screw conveyor). It is then loaded onto a work surface (e.g., via a spreading mechanism, such as in WO 02/083323 (PCT/DE02/01103), hereby incorporated by reference) or more preferably to a temporary holding container.

The work surface is preferably a workpiece platform of a suitable system for forming three-dimensional forms. An example of a suitable job box for carrying a work surface is disclosed in WO 02/26478 (PCT Application No. PCT/DE01/03662), hereby incorporated by reference. See also U.S. Pat. No. 6,423,255, hereby incorporated by reference.

A preferred system includes a binder fluid dispenser into which binder is supplied in a fluid state, a work surface upon which a plurality of particles may be loaded, such as particles contacted with an activation agent for the binder, a mechanism for spreading particulated material (e.g., a spreading mechanism includes an oscillating blade, a doctor blade, a counter rotating roller, or a combination thereof); and a processor for commanding the binder fluid dispenser to dispense the binder fluid according to data from a computer-derived model. Preferably, the binder fluid dispenser and the work surface are adapted for translation about at least three axis. For example, the binder fluid dispenser (preferably a drop-on-demand dispenser, such as an ink-jet type dispenser) might have one or a plurality of nozzles translatable in the x-y Cartesian plane, with the work surface being translatable in the z-axis. Either or both of the binder fluid dispenser nozzles or the work surface (e.g., as part of a gantry) may additionally or alternatively be rotatable about an axis.

Examples of a spreading mechanisms are described, without limitation, in WO 02/083323 (PCT/DE02/01103), or WO 02/26420 (PCT Application No. DE01/03661), both hereby expressly incorporated by reference. Accordingly, a preferred spreading mechanism includes a movable (e.g., oscillatable) hopper, into which particles are loaded. The hopper has an opening, such as a slit at the bottom, through which particles can be dispensed when the hopper is moved. A smoothing device (e.g., a blade, counter roller or the like) is preferably attached adjacent the hopper opening. As particles are released through the opening, they are thus smoothed by the smoothing device. In this manner, a relative flat and smooth build-up of a layer of particles is possible on the work surface. Layer thicknesses may be controlled as desired. For example, layers may range in thickness from about 0.05 mm to about 1 mm are formed, and more preferably about 0.1 mm to about 0.4 and still more preferably about 0.15 to about to 0.3 mm. Smaller or larger thicknesses are also possible.

It is possible that the system may also an overflow cavity defined in it for receiving excess material, and possibly a movable cleaning element to transfer excess material to the overflow cavity. A separate partially sealed clean area may also be employed in combination with a work area. Thus, a system of the type disclosed in U.S. Pat. No. 6,375,874, hereby expressly incorporated by reference, may also be employed.

After particles are spread, they are selectively contacted with the binder material. Preferably the binder material is dispensed through at least one binder fluid dispenser, and preferably one characterized in that it employs piezoelectric jets (e.g., as described in U.S. Pat. No. 6,460,979, hereby incorporated by reference), a continuous jet spray, an intermittent jet spray, dispenses through a mask, includes a single dispensing nozzle, includes a plurality of dispensing nozzles that are clustered together, includes a heated nozzle, includes a plurality of dispensing nozzles that are spaced apart, or combinations of at least two of the foregoing characteristics.

Though a variety of other print heads may be employed, in a particularly preferred embodiment, a piezo bending transducer drop-on-demand print head is employed. One or a plurality of transducers is subjected to a triggering pulse to achieve drop discharge movement. It is also possible that, in a plural transducer head, and, each piezo bending transducer neighboring the piezo bending transducer triggered by the triggering pulse is subjected to a compensating pulse deflecting it. See also, U.S. Pat. No. 6,460,979, hereby incorporated by reference.

A preferred droplet density for dispensing fluids through a print head ranges from about 50 dpi to about 1000 dpi. A droplet line density ranging from 100 to 600 dpi is particularly preferred. Higher or lower densities are also possible. For example, a typical dispensing nozzle may range from about 20 to about 100 microns, more preferably about 30 to about 80 microns, and still more preferably about 50 to about 60 microns. Accordingly, droplet diameters less than about 100 microns, more preferably less than 60 microns are possible (it being recognized that a 60 micron diameter corresponds generally with a droplet volume of about 80 pl), and diameters as low as about 10 microns or smaller are also possible. Droplet ejection frequency may be varied as desired, but preferably it will be at least 1 Hz, more preferably at least 5 Hz. In one embodiment a frequency of 15 Hz or higher is possible.

The relative amounts of binder to activation agent materials may be selected and varied as desired. In one embodiment, the relative amount (in parts by weight) of binder to activation agent is about 1:10 to about 10:1, and more preferably it is about 1:4 to about 4:1. Still more preferably the amount of binder to activation agent is about 2:1. For example, in one preferred embodiment employing a furane resin and sand, a mixture will preferably include about 0.3 weight percent of the activation agent and about 0.6 weight percent of the binder.

Overall, it is preferred to use less than about 25%, more preferably less than 10% and still more preferably less than 2% by weight overall of a binder in a form that includes particles, binder and activation agent. Of course, higher or lower amounts are also possible.

To assist in curing of or otherwise hardening the binder material one or more additional stimuli may be employed, including without limitation heat, infrared radiation, ultraviolet radiation, moisture, air, a vacuum, an inert environment, a reactive gas environment, catalysis, combinations thereof, or the like.

In this regard, the hardening may be performed is a separate enclosed chamber to assure a particular environment. It may also be enhanced such as by heating the work surface of the system, by heating the binder material prior to dispensing (e.g., while it is in a container), during dispensing (e.g., by providing a heated dispensing head, nozzle or both), or following dispensing. A preferred temperature range for facilitating curing of the binding material is about 15° C. to about 40° C., and more preferably about 20° C. to about 30° C. (e.g., for a furane resin it preferably cures at ambient room temperature). However other resins with a curing point at higher temperature levels are also possible to use, and therefore higher temperatures (or possibly lower temperatures may also be employed.

Examples of additional techniques that may suitably be employed in the present invention include those disclosed, without limitation, in U.S. Pat. No. 6,147,138 (hardened using one or a combination of heat or a reactive gas atmosphere), U.S. Pat. No. 6,423,255; WO 02/26419 (addressing hardening selectively dosed binder in a reactive gas atmosphere).

Further, in some applications, it may be desirable to also remove the three-dimensional form from surrounding bound particle material. Any suitable process may be employed, such as that in WO 02/28568 (PCT Application No. PCT/DE01/03834), hereby expressly incorporated by reference.

Additional variations are also possible. For example, compositions of particles, binder material, activation agent, or any combination thereof may be constant throughout a form, or it may vary as between two or more different layers.

In addition, it may be possible to employ a silk screening step in delivering the binder material to a layer of particles, such as by using techniques discussed in U.S. Pat. No. 6,193,922, hereby incorporated by reference.

For one embodiment, one particularly preferred material system furane resin, which preferably contains furfuryl alcohol in a proportion of at least 50 percent and ethane diol in a proportion of approximately 4 percent as well as water, is preferably used as binding material. The preferred curing agent contains toluene sulfonic acid in a proportion of 45 to 55 percent, diethylene glycol in a proportion of 5 to 15 percent and sulphuric acid in a proportion of at most 1 percent. For this embodiment, the preferred binder material and the preferred curing agent are preferably used in a ratio of weight of 2:1.

The present invention is useful for and is contemplated for use in a method for making any of a variety of different three dimensional forms, such as those selected from the group consisting of a casting mold (e.g., for metal castings, lost-foam castings, casting that have hollow internal portions that require an internal mold core part, ceramic castings, metal matrix composite castings, or any other castings), a die for molding (e.g. blow molding, rotational molding, injection molding), a die for thermoforming, an extrusion die, an orthopedic implant, a dental restoration, a vascular tissue, a sustained release drug form, a monochromatic prototype part, a multi-colored prototype part, a sculpture, a gradient index lens, a hollow part (e.g., a hollow metal part), an electronics component, a cutting tool (e.g., a ceramic tool such as a tungsten carbide tool or other carbide tool), and a metal matrix composite. The present invention also contemplates articles that are prepared according to the methods herein. For example articles of the invention include a plurality of layers that include particles bound together by a binder material system that is at least two components, including an activation agent and a binder material, wherein the binder material is not contacted with the particles prior to the activation agent.

The invention finds particularly attractive utility in the manufacture of molds for casting of metals. Without limitation, examples of the use of the methods of the present invention include the formation by metal casting with a mold prepared by the methods herein of an automotive vehicle component (e.g., a cylinder head, a wheel, a powertrain component, a suspension component, a housing, or otherwise).

It will be further appreciated that functions or structures of a plurality of components or steps may be combined into a single component or step, or the functions or structures of one step or component may be split among plural steps or components. The present invention contemplates all of these combinations.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A method for manufacturing a three-dimensional metal casting mold, comprising:
   a) providing a plurality of silica sand particulates that are substantially free of binder material;
   b) coating at least a portion of a surface of each of the plurality of silica sand particulates with an activation agent;
   c) contacting a pre-selected portion of the particulates having the activation agent present upon the particulates with a binder material that is activatable by the activation agent pursuant to which binder material is contacted with the particulates no earlier than when the binder material first contacts the activation agent;
   d) at least partially hardening the binder material, crosslinking the binder material to itself and coupling adjoining particulates to each other with the binder material for forming a layer of the three-dimensional metal casting mold by the reaction between the binder material and the activation agent; and
   e) repeating the steps (a)-(d) to form the remainder of the three-dimensional metal casting mold;
   wherein the binder material includes molecules that crosslink among each other and the binder material is selected from the group consisting of phenol resin, polyisocyanate, polyurethane, epoxy resin, furane resin, polyurethane polymer, phenolic polyurethane, phenol-formaldehyde furfuryl alcohol, urea-formaldehyde furfuryl alcohol, formaldehyde furfuryl alcohol, peroxide, polyphenol resin, resol ester and mixtures thereof, and
   wherein the binder material is present at a concentration of less than 2 weight percent based on the total weight of the mold.

2. The method of claim 1 wherein the activation agent is selected from the group consisting of acids, amines, alcohols, ketones, salts, and mixtures thereof.

3. The method of claim 2 wherein the binder material is selected from the group consisting of epoxy resin, furane resin, and mixtures thereof.

4. The method of claim 3 wherein heat is applied prior to or during the hardening step.

5. The method of claim 3 wherein the activation agent coating step (b) is done by a step selected from brushing, rolling, blading, spraying, plating or a combination thereof.

6. The method of claim 3 wherein the binder material contacting step (c) includes dispensing the binder material through a drop-on-demand dispenser.

7. The method of claim 1 wherein the viscosity of the binder material at 20° C., ranges from 5 to 60 cps.

8. The method of claim 1, further comprising a step of re-using particulates that are not contacted with the binder material.

9. The method of claim 8 wherein the binder is an organic material, heat is applied prior to or during the hardening step, and the activation agent includes one or more acids selected from the group consisting of sulfuric acid, sulfonic acid, phosphoric acid, hydrochloric acid, and nitric acid.

10. The method of claim 9 further comprising pouring a material, selected from a metal or a plastic, in a molten state, into a resulting mold to form a part using the mold.

11. The method of claim 9 wherein the particulates are foundry sand particles, wherein 80 percent by volume of the particles have a diameter from 90 μm to 210 μm.

12. The method of claim 9, further comprising forming a core in the mold.

13. A method for manufacturing a three-dimensional metal casting mold, comprising:
   a) coating a plurality of individual sand particles that are substantially free of binder material with an activation agent;
   b) dispensing an organic activatable resin binder material through a print head over preselected portions of the sand particles that include the activation agent for contacting the activation agent, pursuant to which the dispensed binder material is contacted with the particles no earlier than when the binder material first contacts the activation agent;
   c) reacting at a temperature of about 20° C. to about 30° C. the binder material with the activation agent for at least partially hardening the binder material, crosslinking the binder material to itself, and coupling adjoining particles to each other with the binder material, for forming a layer of the three-dimensional metal casting mold;
   d) repeating the steps (a)-(c) to form the remainder of the three-dimensional metal casting mold; and wherein the binder material includes at least one material selected from the group consisting of phenol resin, polyisocyanate, polyurethane, epoxy resin, furane resin, polyurethane polymer, phenolic polyurethane, phenol-formaldehyde furfuryl alcohol, urea-formaldehyde furfuryl alcohol, formaldehyde furfuryl alcohol, peroxide, polyphenol resin, resol ester, or mixtures thereof, and wherein the binder material is present at a concentration of less than 2 weight percent based on the total weight of the mold.

14. A method according to claim 13, wherein the sand is selected from quartz, zircon, olivine, magnetite, or combination thereof, and wherein the particles include at least 80 percent by volume particles with an average particle size ranging from about 30 µm to about 450 µm.

15. A method according to claim 13, wherein the activation agent includes one or more acids selected from the group consisting of sulfuric acid, sulfonic acid, phosphoric acid, hydrochloric acid and nitric acid.

16. A method according to claim 13, wherein the activation agent includes an amine.

17. A method according to claim 16 wherein, the activation agent includes an aliphatic amine.

18. A method according to claim 16 wherein the activation agent includes an aromatic amine.

19. A method according to claim 15, wherein the sand includes reclaimed sand.

20. A method according to claim 16, wherein the sand includes reclaimed sand.

21. A method according to claim 15, wherein at least one period of at least 2 hours elapses between steps (a) and (b).

22. A method for making a mold for a metal casting comprising the steps of:
   a. coating a plurality of individual uncoated sand particles, having an uncoated diameter, with an acidic activation agent for forming a plurality of individual coated sand particles having a resulting diameter of about 1.0 to about 2.5 times the uncoated diameter;
   b. spreading a layer of the coated sand particles on a workpiece platform by dispensing coated sand particles through an opening of a moveable hopper;
   c. forming a smooth layer having a thickness of from about 0.15 to about 0.30 mm;
   d. selectively contacting the resulting smooth layer with a furane resin binder material, a binder material, or both by dispensing the resin, in droplets of a density of 100 to 600 dots per inch and no earlier than when the furane resin or binder material first contacts the activation agent, through a piezo bending drop-on-demand print head, the binder being dispensed in an amount of about 2 parts binder to 1 part activation agent;
   e. curing the binder at ambient room temperature for causing the binder to crosslink and covalently bond the resin to form a matrix in which the sand particles are dispensed;
   f. repeating at least steps (b)-(e) until a metal casting mold is completed wherein the binder material is present at a concentration of less than 2 weight percent based on the total weight of the mold.

23. A method according to claim 22 further comprising a step of reclaiming sand that is not contacted with the binder.

24. A method according to claim 23, wherein the sand includes reclaimed sand that is free of binder material.

25. A method according to claim 23, wherein the acidic activation agent includes one or more acids selected from the group consisting of sulfuric acid, sulfonic acid, phosphoric acid, hydrochloric acid, and nitric acid.

26. The method of claim 25, wherein the acid includes sulphuric acid.

27. The method of claim 25, wherein the acid includes sulfonic acid.

28. The method of claim 25, wherein the coating step includes contacting the sand particles with a polyol.

29. The method of claim 25, wherein the binder material comprises the furane resin binder material.

30. A method for manufacturing a three-dimensional metal casting mold, comprising the following successive steps:
   a) providing a plurality of individual particulates comprising sand, wherein at least a portion of a surface of the individual particulates is pre-coated with an activation agent;
   b) contacting a pre-selected portion of the particulates having the activation agent present upon the particulates with a binder material that is activatable by the activation agent;
   and
   c) at least partially hardening the binder material, for forming a layer of the three-dimensional metal casting mold;

wherein the binder material is present at a concentration of less than 2 weight percent based on the total weight of the mold.

31. A method according to claim 13, wherein the ratio of binder to activation by weight is about 1:4 to about 4:1.

32. A method according to claim 13, further including a reinforcement.

* * * * *